3,293,404
ARC WELDING
Aubrey Moe, Roskilde, Denmark, and Frank John Hetzler, San Jose, Calif., assignors to Atomenergikommissionen, Copenhagen, Denmark
Filed Nov. 13, 1963, Ser. No. 323,377
Claims priority, application Denmark, Nov. 14, 1962, 4,897
5 Claims. (Cl. 219—123)

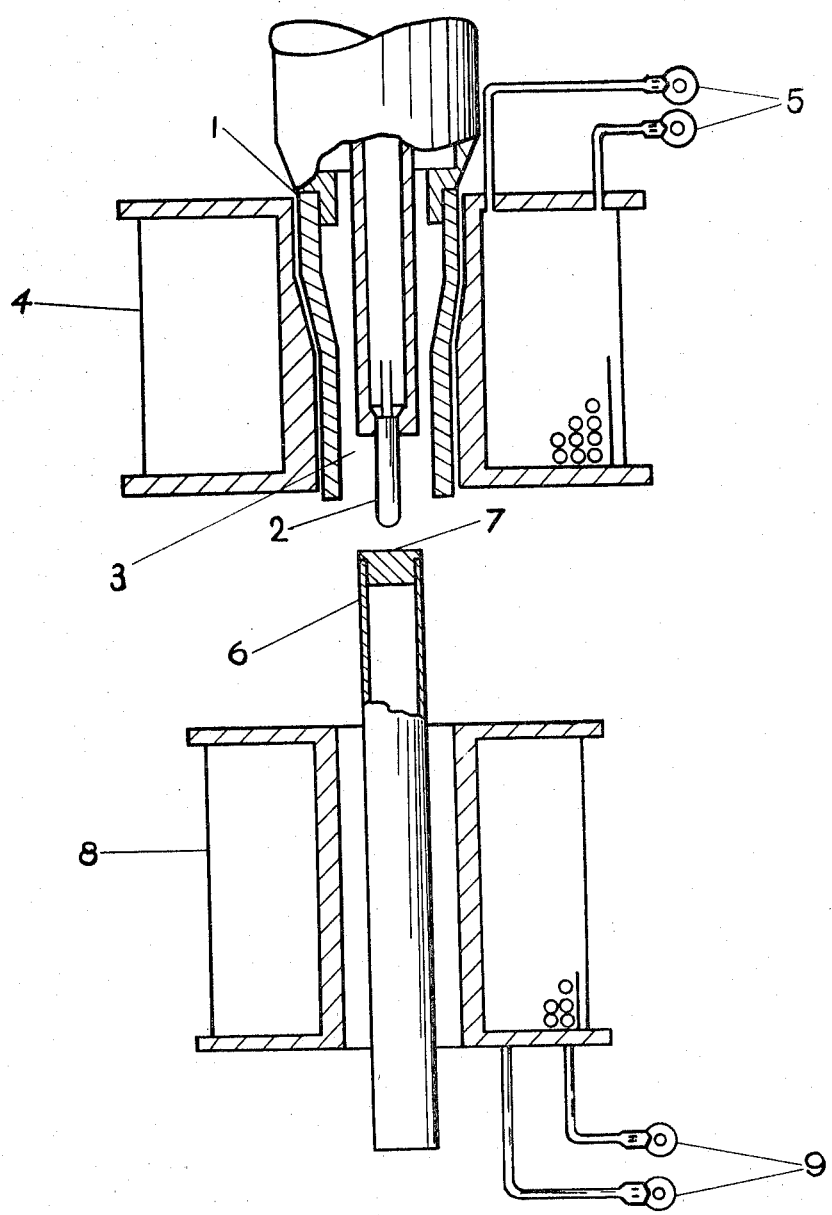

It is well known that arc welding of metals, especially of metals of the category considered difficult to weld, often gives relatively bad or unacceptable results. Overheating of the metals causes local melting or oxidation. The method of mechanical conducting of the arc along the welding track also causes the welding seam to consist of a number of distinct welding seams placed one on top of the other or one beside another in such a manner that the welding is irregular.

To avoid these disadvantages it has been proposed when welding annular welds to move or conduct the arc from an annular welding electrode by means of a magnet placed over the electrode. There is thus obtained an arc which is moved around the welding track with high velocity, and which therefore at least theoretically, should give a welding seam which is regular and free of faults. In practice, however, this is found not to be possible with the aforementioned apparatus.

The results with metals which are difficult to weld, e.g. sintered aluminum containing a network of dispersed alumina, or zirconium hydride containing zirconium, or zirconium alloys, are of such a kind that welds of such metals are not satisfactory.

It has now been found that satisfactory welding results can be obtained with an apparatus for ac welding having an arc which is moved in a track by a magnetic field, which apparatus according to this invention has two magnets of which one is placed so that a majority of the lines of force emanating therefrom pass through the arc where this leaves the welding electrode, while the other is placed so that the majority of the lines of force emanating therefrom pass through the arc where it meets the weld.

Besides the advantage that it is possible with the apparatus according to the invention to obtain satisfactory welding results where other welding methods fail, the apparatus has the advantage that it can be constructed by relatively simple means employing conventional direct current welding apparatus.

The magnets to be used in the apparatus according to the invention can be permanent magnets or electromagnets but the field strength and the shape of the field may be modified to a particular welding operation.

The apparatus according to the invention can be adapted to perform a variety of geometrical shapes of welding seams, but the main use of the apparatus is the performance of circular welding seams such as are used for welding end plugs into tubes.

One embodiment of the apparatus according to the invention has two magnets one placed around the welding electrode and other around the work piece which results in a circular symmetrical shape of the magnetic field.

In cases where a great number of similar work pieces have to be welded an apparatus with a predetermined field strength and shape of field can be used. It is, however possible to change these parameters at will. Therefore at least one of the magnets, and preferably the magnet whose lines of force pass through the arc where it meets the weld, is an electromagnet whose magnetic field strength can be changed as desired. Alternatively or at the same time at least one of the magnets, and preferably the magnet whose lines of force pass through the arc where it meets the weld, can be moved in a direction parallel to the longitudinal axis of the welding electrode and the work piece.

The invention will now be described in connection with the drawing which shows welding apparatus according to the invention.

The welding apparatus consists of a welding torch 1 of conventional structure having a welding electrode 2 of tungsten electrode and a conduit 3 for an inert gas such as argon. Around the welding torch is placed a magnet 4 which is fed by leads 5 from a source of direct current.

At a distance from the electrode 2 corresponding to a suitable spark gap is placed a work piece in the shape of a tube 6 to which an end plug 7 is to be welded. Around the work piece is placed a magnet coil 8 which is fed by leads 9 from a source of direct current. A time breaker (not shown) is also attached which automatically breaks the welding current after a predetermined time dependent on the nature of the welding, and a valve (not shown) is also provided for controlling the stream of inert gas in conduit 3.

In a specific example of an apparatus according to the invention the dimensions for welding an aluminum plug (99% Al) to a tube of sintered aluminum having a network of dispersed alumina, and having around the plug a tubular filling of a eutectical alloy of aluminum and silicon are:

Electrode: 4 mm. diameter, tungsten.
Spark gap: 4 mm.
Distance between magnets 25 mm.
The magnets have opposite poles facing each other.
Both magnets about 700 turns.
Current to magnets: 4 amperes.
Welding current: 30 amperes.
Welding time including heating and cooling: 30 seconds.
Welding heat: 11 kilowattseconds.
Inert gas: Argon.

Among a great number of samples of similar welded pieces seven representative samples were chosen among which were one representing minimum strength of the welding seam and one representing maximum strength obtained. The minimal strength of the tubes as such were as shown by a water pressure test 23.07 kg./mm.$^2$.

The seven samples showed the following strength.

| Total strength kg./mm.$^2$: | Strength in percent of the minimal strength of the tubes as such |
|---|---|
| (1) 22.44 | 97.3 |
| (2) 23.50 | 101.9 |
| (3) 23.60 | 102.3 |
| (4) 24.25 | 105.1 |
| (5) 25.79 | 111.8 |
| (6) 26.25 | 113.8 |
| (7) 27.88 | 120.8 |

According to these results the reliability of the welds were calculated statistically to be 99.8%.

The quality of the welded tubes was furthermore estimated visually and it appeared that the welding seams were perfectly smooth and regular which was evidently contrary to traditionally welded tubes. A test for leaking with helium under pressure showed that the tubes were completely gas tight.

What we claim is:

1. Apparatus for welding having means for creating a welding arc between a welding electrode and a work piece, means for providing a magnetic field to move said welding arc in a predetermined track comprising two magnets one of which is placed so as to have a majority of the lines of force emanating therefrom passing through the welding arc where this leaves the welding electrode, the other of which is placed so as to have a majority of the lines of force emanating therefrom passing through the welding arc where it meets the weld.

2. The apparatus of claim 1 in which said one magnet is placed around the welding electrode and said other magnet is placed around the work piece.

3. The apparatus of claim 1 in which said other magnet is an electro-magnet the field strength of which is controllable.

4. The apparatus of claim 1 in which said one magnet is an electro-magnet the field strength of which is controllable.

5. The apparatus of claim 1 in which said other magnet is movable in a direction parallel to the axis through the welding electrode and the work piece.

References Cited by the Examiner

UNITED STATES PATENTS

| 1,854,536 | 4/1932 | Wilson | 219—123 |
| 2,743,342 | 4/1956 | Bettis et al. | 219—123 |
| 2,972,695 | 2/1961 | Wroe | 219—123 X |

JOSEPH V. TRUHE, *Primary Examiner.*